United States Patent [19]
Johnson

[11] Patent Number: 5,719,545
[45] Date of Patent: Feb. 17, 1998

[54] HIGH POWER FACTOR SHIELDED SUPERCONDUCTING TRANSFORMER

[75] Inventor: Leopold J. Johnson, Valley Center, Calif.

[73] Assignee: The United States of America as represented by the Secretary of the Navy, Washington, D.C.

[21] Appl. No.: 323,942

[22] Filed: Oct. 12, 1994

[51] Int. Cl.$^6$ .................................................. H01F 27/00
[52] U.S. Cl. .......................... 336/180; 336/187; 336/83; 336/216; 336/200
[58] Field of Search ................................ 336/DIG. 1, 187, 336/83, 216, 200, 180

[56] References Cited

U.S. PATENT DOCUMENTS

| | | |
|---|---|---|
| 3,214,679 | 10/1965 | Richards . |
| 4,336,561 | 6/1982 | Murphy . |
| 4,621,203 | 11/1986 | Sweeny . |
| 5,097,243 | 3/1992 | Zieren et al. ........................... 336/200 |
| 5,126,714 | 6/1992 | Johnson . |
| 5,126,715 | 6/1992 | Yerman et al. . |
| 5,168,259 | 12/1992 | Takemura ............................... 336/216 |
| 5,329,225 | 7/1994 | Roshen et al. ....................... 336/DIG. 1 |

OTHER PUBLICATIONS

"Introductory Circuit Analysis". Robert L. Boylestad. 2nd Edition. Charles E. Merrill & Co, 1972. p.275.
"Practical Switching Power Supply Design". Marty Brown, Academic Press, 1990. pp. 68–71.
Weinman et al, "Stability of Bi–Level and Tri–Level Contacts to High Temperature Superconductors",First Quarter Report by Thin Film Concepts, Inc. 28 Jun. 1994, pp. 1–11.
McGinnis et al, "Prototype Superconducting Planar Transformers Using High–$T_c$ Thin and Thick Films", Naval Ocean Systems Center, Technical Report 1479.

*Primary Examiner*—Michael L. Gellner
*Assistant Examiner*—G. R. Lord
*Attorney, Agent, or Firm*—Harvey Fendelman; Michael A. Kagan; Eric James Whitesell

[57] ABSTRACT

A superconducting transformer comprises a superconducting primary layer arranged to conduct an externally supplied primary electric current around a primary core to establish a magnetic flux through the primary core. The superconducting primary layer is formed on a primary substrate of electrically insulating, non-magnetic material. A superconducting secondary layer is arranged to conduct a secondary electric current around a secondary core. The superconducting secondary layer is formed on a secondary substrate of electrically insulating, non-magnetic material. The primary and secondary cores are made of a non-saturating material. The secondary electric current is generated by stacking the layers to couple the magnetic flux from the primary core to the secondary core. Superconducting vias are formed through the primary, isolation, and secondary layers for making external connections to the transformer. The superconducting transformer may be enclosed within a capacitor shield comprising an insulating layer, an inner superconducting layer, a dielectric layer, and an outer superconducting layer. The inner and outer superconducting layers form a capacitor which may be connected in parallel with the primary layer by the superconducting vias. The capacitor shield isolates external components from the electromagnetic field of the superconducting transformer, and provides a capacitive reactance substantially equal to the inductive reactance of the primary layer for correcting the power factor of the superconducting transformer. Electrical connections are formed through the capacitor shield for making external connections to the superconducting transformer.

6 Claims, 3 Drawing Sheets

HIGH POWER FACTOR SHIELDED SUPERCONDUCTING TRANSFORMER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention is directed to the field of superconducting transformers. More particularly, but without limitation thereto, the present invention relates to a superconducting transformer comprising a superconducting capacitor and a superconducting magnetic shield.

Superconducting transformers are used advantageously to achieve high efficiency and high power density. However, the intensity of the electrical currents associated with superconductors generates magnetic fields that may couple interference into external circuits.

One disadvantage of superconducting transformers is that the low inductance of the primary circuit requires a high excitation, or reactive power, relative to the load demand, a condition commonly known as a low power factor. Supplying power to the inductive reactance of the primary circuit requires a more expensive power source than would be required only for the resistive load.

Another disadvantage is that the power losses in the non-superconducting connections between the power source and the transformer generate heat, which reduces overall efficiency and may require even more energy for cooling.

In view of the above disadvantages and limitations described above, a need exists for a superconducting transformer having a high power factor and electromagnetic shielding. The present invention is directed to this need and may provide further related advantages.

SUMMARY OF THE INVENTION

A superconducting transformer comprises a first superconducting layer patterned to conduct a primary electric current around an electrically insulating, non-saturating primary core for establishing a magnetic flux through the primary core. The first superconducting layer is formed on a substrate of electrically insulating, non-magnetic material to form a primary layer. A second superconducting layer is patterned to conduct a secondary electrical current around an electrically insulating, non-saturating secondary core. The second superconducting layer is formed on a substrate of electrically insulating, non-magnetic material to form a secondary layer. The primary and secondary layers are stacked to couple the magnetic flux from the primary core to the secondary core, thus generating the secondary electrical current. Superconducting vias may be formed in the primary and secondary layers for making electrical connections between primary and secondary layers. Electrical contacts may be formed on the primary and secondary layers for making external connections to the superconducting transformer.

The superconducting transformer may be enclosed within an insulating layer, an inner superconducting layer, a dielectric layer, and an outer superconducting layer. The outer superconducting layer shields components external to the transformer from the electromagnetic field of the transformer, and shields the transformer from electromagnetic fields external to the inner superconducting layer. The inner and outer superconducting layers may also be connected in parallel with the primary layer contact terminals to form a capacitor for correcting the power factor of the superconducting transformer.

Multiple primary and secondary layers may be stacked in various arrangements to select different winding ratios and to provide impedance matching taps. The stacking of primary and secondary layers may be performed using well known semiconductor and integrated circuit manufacturing methods.

An advantage of the present invention is that the stacked layers of the superconducting transformer readily allows selecting various winding ratios by altering the arrangement of the primary and secondary layers.

Another advantage of the present invention is that the transformer may be miniaturized to fit standard integrated circuit packaging while having a high power rating relative to the size of the transformer.

A further advantage of the present invention is that the capacitor shield may be designed to have the capacitance needed to correct the power factor of the transformer at a selected operating frequency. The excitation or reactive current may then be supplied by the capacitor shield, and the power source need only supply the current required by the load.

Still another advantage of the present invention is that the capacitor shield isolates the electromagnetic field of the transformer from circuits external to the transformer.

The presently preferred embodiment described below does not preclude other embodiments and advantages that may exist or become obvious to those skilled in the art, and is but one example of the present invention.

The features and advantages summarized above in addition to other aspects of the present invention will become more apparent from the description, presented in conjunction with the following drawings.

DESCRIPTION OF THE INVENTION

The following description presents the best mode currently contemplated for practicing the present invention. This description is not to be taken in a limiting sense, but is presented solely for the purpose of disclosing how the present invention may be made and used.

Figure 1:
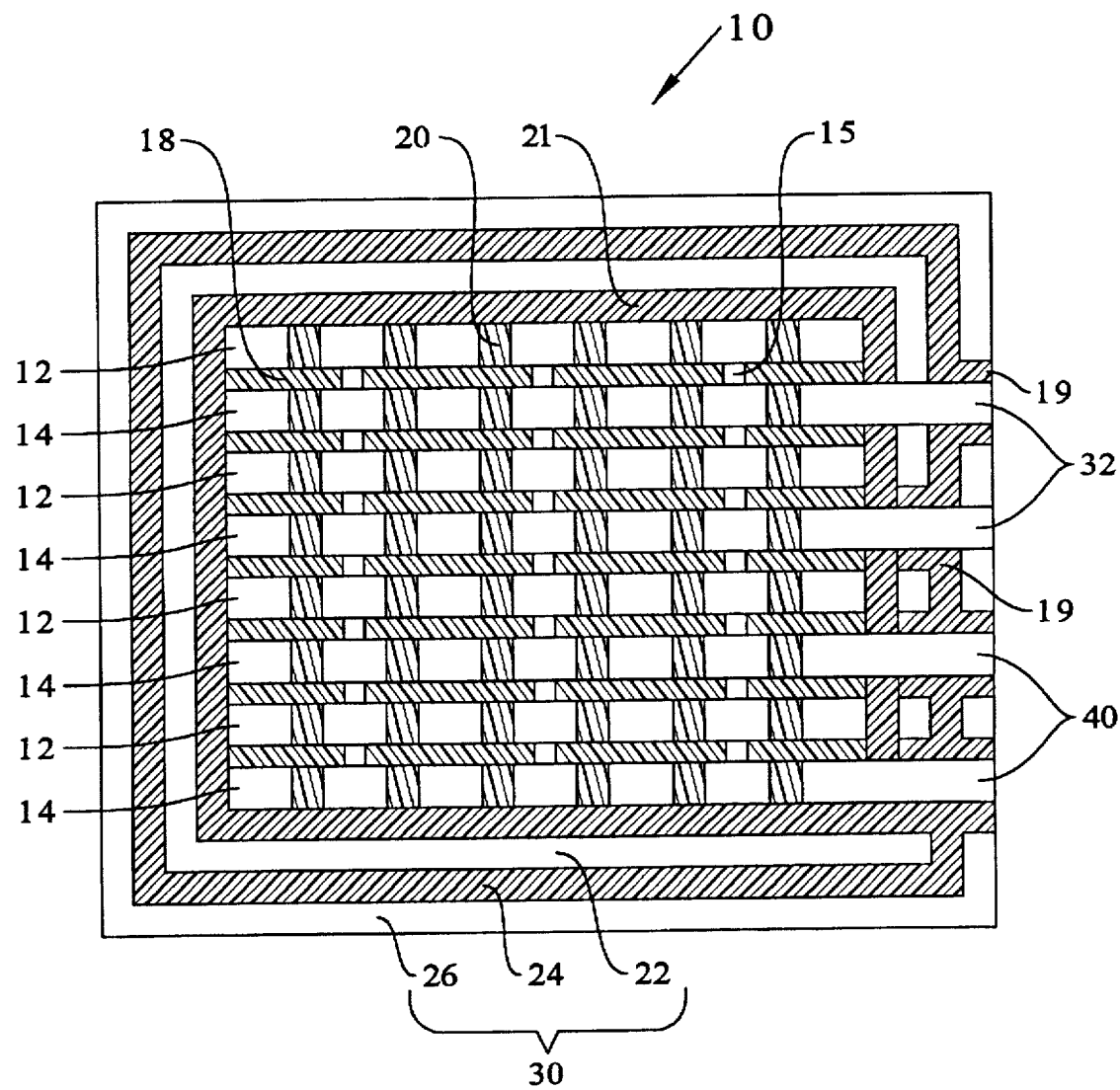
FIG. 1 is a cross sectional view of the shielded high power factor superconducting transformer embodying various features of the present invention.

FIG. 1 shows an example of a superconducting transformer 10 of the present invention having having primary layers 12 and secondary layers 14. An example of a conductive winding pattern for primary layers 12 and secondary layers 14 is described in U.S. Pat. No. 5,126,714, incorporated herein by reference. However, rather than being formed from layers of copper clad fiberglass as described in the '714 patent, each of primary layers 12 and secondary layers 14 is formed from a superconducting material, preferably a high temperature superconductor compound such as $YBa_2Cu_3O_7$. Primary layers 12 and secondary layers 14 are electrically insulated from each other by isolation layers 18.

Figure 3:
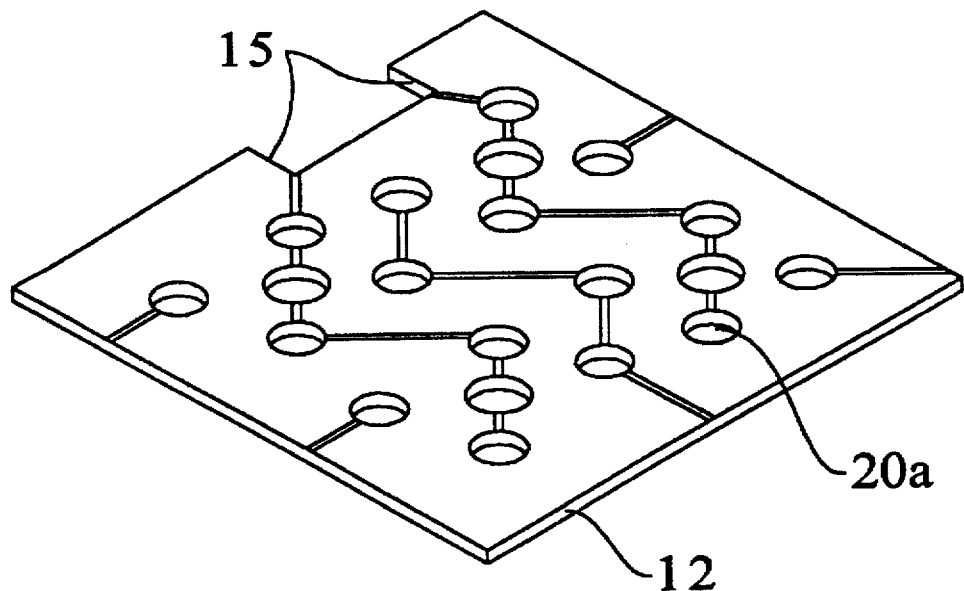
FIG. 3 is an exploded view of the primary and secondary layers of the prior art.
Figure 3:
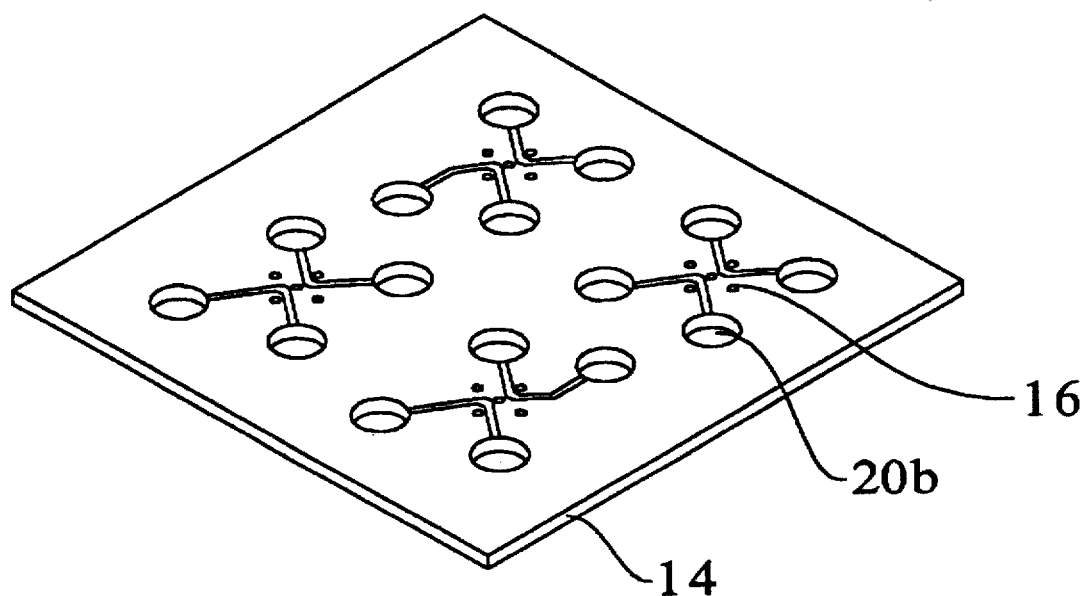

Isolating layers 18 may be formed from a non-magnetic and electrically insulative material such as barium titanate, which has a dielectric constant of about 1000 and a permeability of about 1. Primary layers 12 may be connected in series/parallel externally by interconnecting tabs 32 with superconducting material. Similarly secondary layers 14 may be electrically interconnected by superconducting vias 15 formed between secondary layers 14 through isolating layers 18. Superconducting vias 15 in FIG. 1 function similarly to vias 16 in FIG. 3. Photolithography, another process used in making semiconductors, may be used to mask the winding patterns for primary layers 12 and secondary layers 14 as shown and described in the '714 patent and as shown in FIG. 3. In order to shorten the magnetic paths and minimize the flux leakage of the high intensity magnetic fields generated by primary layers 12 and secondary layers 14, primary cores 20a and secondary cores 20b are preferably scaled smaller and more closely spaced relative to the area of the layers than those shown in FIG. 3 of the '714 patent. Primary and secondary cores 20 in FIG. 1 are made of a non-saturating material.

FIG. 3 shows primary layer 12 patterned to conduct a primary electrical current around primary core 20a for establishing a magnetic flux through primary core 20a. Secondary layer 12 is patterned to conduct a secondary electrical current around secondary core 20b. Secondary electrical current 20b is generated by coupling magnetic flux from primary core 20a to secondary core 20b.

Referring now to FIG. 1, a superconducting inductor may comprise one or more primary layers 12, while a superconducting transformer may comprise one or more primary layers 12 interleaved with one or more secondary layers 14. Different arrangements in the stacking of primary layers 12 and secondary layers 14 may offer further advantages, such as control of the transformer capacitance. Internal connections and taps to primary layers 12 and secondary layers 14 may be made by forming superconducting vias 15 through isolating layers 18.

As shown in FIG. 1, an outer insulating layer 21, which may be made of an electrically insulating and non-magnetic material such as barium titanate, may be formed around the stack of primary layers 12 and secondary layers 14. An inner superconducting layer 22, a dielectric layer 24, and an outer superconducting layer 26 may be sequentially formed around outer insulating layer 21 to form a capacitor shield 30. Capacitor shield 30 may be electrically connected in parallel with primary layers 12 by interconnecting tabs 32. External electrical connections 40 may be made to primary layers 12 and secondary layers 14 through feedthrough voids 19 in capacitor shield 30 and outer insulating layer 21.

Superconducting transformer 10 may also be used as a high-Q parallel tuned circuit by electrically connecting the inductor described above in parallel with capacitor shield 30 by means of superconducting vias 32 traversing feedthrough voids 19 as shown in FIG. 1.

Capacitor shield 30 provides a capacitive reactance to compensate for an inductive reactance of primary layers 12 at an operating frequency. The capacitive reactance is established by appropriately sizing an area of superconducting layer 22 and by selecting a material for dielectric layer 24 having an appropriate dielectric constant and thickness according to the well known formulas:

$$x_c = 1/2\pi f c \quad (1)$$

and $$c = \epsilon A/d, \quad (2)$$

where:
$X_c$=capacitive reactance
f=operating frequency
c=capacitance of capacitor shield 30
$\epsilon$=dielectric constant
A=area of superconducting layer 22.

Figure 2:
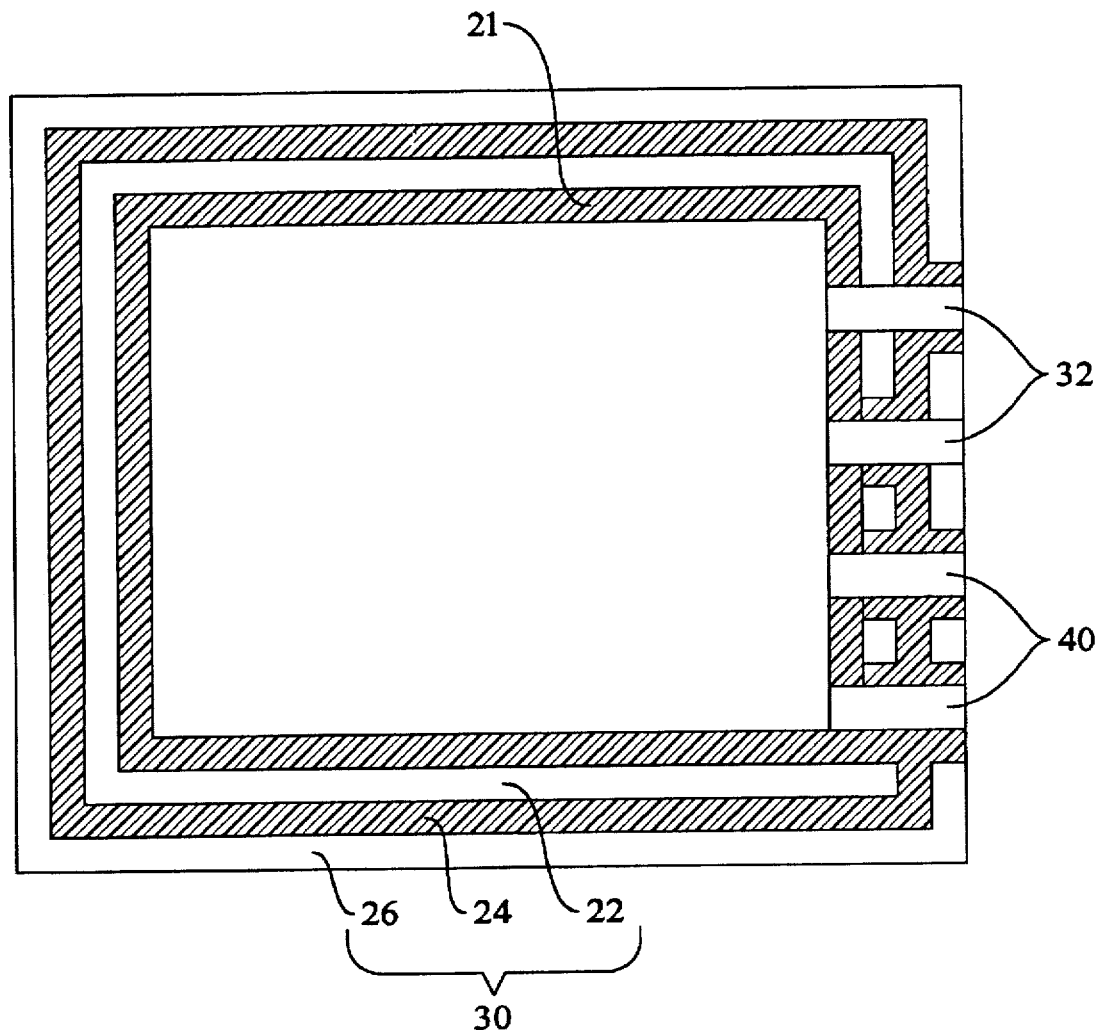
FIG. 2 is a cross sectional view of the capacitive shield of the present invention.

FIG. 2 shows capacitor shield 30 alone, which may be used to shield other circuits (not shown) from external electromagnetic radiation and to provide a capacitive reactance. Superconducting vias 32 provide electrical connection to capacitor shield 30, and electrical contacts 40 allow external connections to the other circuits.

Other modifications, variations, and applications of the present invention may be anticipated by the scope of the invention as set forth in the following claims.

What is claimed is:

1. A superconducting transformer, comprising:

an isolation layer of electrically insulating, non-magnetic material having opposite upper and lower surfaces;

a primary core made of a non-saturating material;

a primary layer of superconducting material formed on the upper surface of the isolation layer patterned to conduct a primary electric current and operably coupled to the primary core for establishing a magnetic flux through the primary core, a secondary core made of a non-saturating material operably coupled to the primary core;

a secondary layer of superconducting material found on the lower surface of the isolation layer patterned to conduct a secondary electrical current, wherein the secondary layer is operably coupled to the secondary core for coupling the magnetic flux from the primary core to the secondary core;

superconducting vias operably coupled to the primary and secondary layers; and electrical contacts operably coupled to file primary and secondary layers for making external electrical connections to the superconducting vias.

2. The superconducting transformer of claim 1, further comprising:

an electrically insulating, non-magnetic layer formed around the primary and secondary layers;

a superconducting inner layer formed around an outside surface of the electrically insulating, non-magnetic layer;

a dielectric layer formed around an outside surface of the inner layer;

a superconducting outer layer formed around an outside surface of the dielectric layer, wherein the outer layer, the dielectric layer, and the inner layer constitute a capacitor having a capacitive reactance substantially equal and opposite to an inductive reactance of the primary layer;

superconducting vias operably coupled to the primary layer, the inner layer, and the outer layer;

electrical connections formed through the insulation layer, the inner layer, the dielectric layer, and the outer layer operably coupled to the primary layer and the secondary layer for coupling to an external connector.

3. The superconducting transformer of claim 1 wherein the primary layer is patterned to conduct the primary current in serially connected current loops each substantially surrounding a single primary core, and the secondary layer is patterned to conduct the secondary current in parallel connected current loops each substantially surrounding a single secondary core.

4. A device for shielding electrical circuits from electromagnetic flux generated by a superconducting transformer and for correcting the power factor of the superconducting transformer, comprising:

an electrically insulating, non-magnetic layer formed around the superconducting transformer;

a superconducting inner layer formed around the electrically insulating, non-magnetic layer;

a dielectric layer formed around the inner layer;

a superconducting outer layer formed around the surface of the dielectric layer, wherein the superconducting outer layer, the dielectric layer, and the superconducting inner layer constitute a capacitor having a capacitive reactance substantially equal and opposite to an inductive reactance of the superconducting transformer;

superconducting vias operably coupled to the superconducting transformer, the inner layer, and the outer layer; and insulated electrical connections formed through the insulating layer, the inner layer, the dielectric layer, and the outer layer operably coupled to the superconducting vias for connection to an external connector.

5. A device for shielding an electrical circuit from electromagnetic flux and for providing a capacitive reactance, comprising:

an electrically insulating, non-magnetic layer formed around the electrical circuit;

a superconducting inner layer formed around the electrically insulating, non-magnetic layer;

a dielectric layer formed around the inner layer for constituting the dielectric of a capacitor;

a superconducting outer layer formed around the dielectric layer, wherein the outer layer, the dielectric layer, and the inner layer constitute the capacitor;

superconducting vias operably coupled to the inner layer and the outer layer; and insulated electrical connections formed through the insulating layer, the inner layer, the dielectric layer, and the outer layer operably coupled to the superconducting vias for coupling to an external connector.

6. A superconducting transformer, comprising:

an isolation layer of electrically insulating, non-magnetic material;

a primary core made of a non-saturating material;

a primary layer of superconducting material formed on an upper surface of the isolation layer operably coupled to the primary core for establishing a magnetic flux through the primary core, an insulation layer of electrically insulating, non-magnetic material;

a secondary core made of a non-saturating material operably coupled to the primary core;

a secondary layer of superconducting material formed on an upper surface of the insulation layer patterned to conduct a secondary electrical current wherein the secondary layer is operably coupled to the secondary core for coupling the magnetic flux from the primary core to the secondary core;

superconducting vias operably coupled to the primary mid secondary layers; and electrical contacts formed on the primary and secondary layers for making external electrical connections to the superconducting vias.

* * * * *